US 8,869,015 B2

(12) United States Patent
Olsen et al.

(10) Patent No.: US 8,869,015 B2
(45) Date of Patent: Oct. 21, 2014

(54) SYSTEM AND METHOD TO PERMIT LANGUAGE INDEPENDENCE FOR WEB INTERFACES

(75) Inventors: Ronald D. Olsen, Lake View, NY (US); Brian Kamrowski, Amherst, NY (US)

(73) Assignee: Dialogic (US) Inc., Parsippany, NJ (US)

(*) Notice: Subject to any disclaimer, the term of this patent is extended or adjusted under 35 U.S.C. 154(b) by 525 days.

(21) Appl. No.: 13/097,531

(22) Filed: Apr. 29, 2011

(65) Prior Publication Data
US 2011/0209047 A1  Aug. 25, 2011

Related U.S. Application Data

(63) Continuation-in-part of application No. 12/151,709, filed on May 8, 2008, now Pat. No. 7,958,442.

(51) Int. Cl.
*G06F 17/00* (2006.01)
*G06F 9/44* (2006.01)
*G06F 17/24* (2006.01)
*G06F 17/22* (2006.01)

(52) U.S. Cl.
CPC ............ *G06F 9/4448* (2013.01); *G06F 17/248* (2013.01); *G06F 17/2247* (2013.01)
USPC ............................ 715/200; 715/205; 715/764

(58) Field of Classification Search
CPC .... G06F 9/448; G06F 17/248; G06F 17/2247
USPC ......................................... 715/200, 205, 764
See application file for complete search history.

(56) References Cited

U.S. PATENT DOCUMENTS

| 6,623,529 | B1* | 9/2003 | Lakritz ........................ 715/205 |
| 6,876,998 | B2* | 4/2005 | Evans .................................. 1/1 |
| 8,027,832 | B2* | 9/2011 | Ramsey et al. ................... 704/9 |
| 2002/0169806 | A1 | 11/2002 | Wang et al. |
| 2003/0225829 | A1* | 12/2003 | Pena et al. ..................... 709/203 |
| 2004/0268238 | A1 | 12/2004 | Liu et al. |
| 2005/0114769 | A1* | 5/2005 | Arkhipov et al. ............. 715/531 |
| 2006/0150097 | A1* | 7/2006 | Dahl ............................ 715/536 |
| 2006/0173886 | A1* | 8/2006 | Moulinier et al. ............ 707/101 |
| 2006/0184826 | A1 | 8/2006 | Argo et al. |
| 2006/0184878 | A1 | 8/2006 | Argo et al. |
| 2006/0271571 | A1* | 11/2006 | Brookler et al. .............. 707/100 |
| 2006/0271572 | A1* | 11/2006 | Brookler ....................... 707/100 |
| 2007/0067154 | A1* | 3/2007 | Ryan, III ........................ 704/8 |
| 2008/0120604 | A1* | 5/2008 | Morris ......................... 717/128 |
| 2009/0077462 | A1* | 3/2009 | Kano et al. ................... 715/234 |
| 2009/0254611 | A1* | 10/2009 | Pena et al. .................... 709/203 |

* cited by examiner

*Primary Examiner* — Stephen Hong
*Assistant Examiner* — Marshon Robinson
(74) *Attorney, Agent, or Firm* — Chapin IP Law, LLC

(57) ABSTRACT

A device user interface in which language is decoupled from a document is disclosed. The language content is stored separately from the document structure and may be located on a content specific server or on a language server. The language server permits centralized collection of language-related content and language services. The document without the language content acts like a template that can be populated with any type of language-related content. The language content can be provided in a separate file together with associated identifiers, and can be loaded into a cache or document object model (DOM) for processing. An XML file may be used for the language file, and the document may be constructed using HTML code. Document components can be assigned event handlers that cause pop-up boxes to be loaded and displayed with language-related content upon an event trigger.

27 Claims, 8 Drawing Sheets

SYSTEM AND METHOD TO PERMIT LANGUAGE INDEPENDENCE FOR WEB INTERFACES

CROSS REFERENCE TO RELATED APPLICATIONS

This application is a continuation-in-part of U.S. patent application Ser. No. 12/151,709, filed on May 8, 2008, the disclosure of which is hereby incorporated herein by reference in its entirety.

STATEMENT REGARDING FEDERALLY SPONSORED RESEARCH OR DEVELOPMENT

N/A

BACKGROUND OF THE INVENTION

The presently disclosed system and method relate generally to dynamic rendering of a document in a display, and more particularly to dynamically rendering the document with a content being presented in a selected language.

A widely employed network communication topography provides for a client and a server to interact to exchange information. In such an architecture, the client typically requests data from the server in the form of a document that can be transmitted over a communication link between the client and the server. Accordingly, the document is preferably, but not necessarily, electronic in form and can be constructed with one or more pages, or a portion of one or more pages, as a web page, a message providing information to the user of the user interface, and any other type of representation of information. For example, a document can be implemented as a web page constructed with HTML and scripting code and having media components with labels, tags, text boxes, menus, text, audio, image, video, symbolic, iconic or representative content, or any other type of media representation, including components or controls for the media representations. As used herein, the term document encompasses all media types, such as those mentioned above as well as other well known types, and provides a representation of media content that can be stored or presented with a user interface.

The request from the client is processed at the server, which responds by sending data to the client in the form of an electronic document. A common protocol for the exchange and transport of information between the client and the server is a hypertext transfer protocol (HTTP) that is deployed on top of a transmission control protocol/internet protocol (TCP/IP). HTTP-based transfers typically include parameters that define the data involved in the exchange, while TCP/IP provides for the control of packets of data exchanged between the client and the server.

The client typically has a user interface with a display, upon which the document transferred from the server may be displayed. The document may be rendered on the display within a web browser using hypertext markup language (HTML) code, style sheets, scripts and/or extended markup language (XML) code, collectively referred to hereinafter as rendering instructions. The web browser operates to read and/or execute rendering instructions to render the document on the display. The rendering instructions may include content, such as language-related content, that is stored, processed, manipulated or displayed by the user interface. As used herein, language-related content is meant to indicate any type of media provided in conjunction with the document, in which a user's language may make the content meaningful to the user. As an example, language-related content may be text used in constructing the document, such as menu text, text for labels, headings, buttons, check boxes, text for help or information pop-up boxes, or for any other type of control or presented information in the display using text. Language-related content is also meant to encompass all media representations that may be found in the document, including such examples as alphanumeric characters, symbols, icons, indicators, indicia, audio, images, video, formatting instructions, such as left-to-right or right-to-left text orientation, formatting queues, tactile media representations, or any other type of information that can be represented in document media that is meaningful to the user in the context of the user's language.

One challenge in rendering a document in a display is presented when different languages are to be represented by the language-related content provided in the rendering instructions. That is, if a document rendered in a display is to be presented in different languages, difficulties arise in translating all the language-related content items provided in the document for display. The document in general may be presented in a large variety of languages, with each different language being supported through the implementation of a different document that can be selectively presented by the browser in the user interface. For example, each document may have labels, instructions, values, help text and other language-related content that is provided in a unique language, so that each document version formed in a different language becomes a unique document.

Accordingly, a new document is generated for each language that is added to the set of available languages from which the user may select. The maintenance and administration of a large of number of separate documents that are to be provided to a user interface in dependence upon a language selection can be daunting. In some cases, a document can represent a certain configuration in relation to a service or product available through a server. If the service or product for which the document is constructed is changed in content or scope, each individual document in each language is modified to reflect the change. Thus, even a simple update to a service or product for which the document is provided represents a large scale effort in modifying and coordinating documents with a wide variety of language-related content that may be impacted by the change. Such an arrangement for providing language dependent documents to a user interface based on a configuration of a server or product is unwieldy and may limit the usefulness of providing different language representations of the document. For example, maintaining a number of different documents based on language differences can be challenging for consistent version control.

A number of advantages and conveniences can be obtained for manufacturers, administrators and users of products that are generally accessible through a network. For example, it may be advantageous and convenient to implement a server within a unit of a given product, where information concerning the product can be made available over an internet connection, for example. Access to the unit can be obtained through the server, for such purposes as configuring various settings or querying various parameters within the unit. When the product is distributed on a wide geographical basis, such as world-wide, a user seeking access to a given unit can be provided with a document through the server embedded in the unit, such document describing the configuration of the unit and permitting the user to install, configure or update the unit, for example. It is highly advantageous to permit a user to administer a given unit as described above on a remote basis, such as through an internet connection with the server embedded in the unit. However, a document provided to the user should provide the unit information in a language and representation that is suitable for the user. When multiple different languages are to be supported by documents available from the server to permit administrative interaction between the unit and the user, the above-described issues and challenges in relation to language-specific documents are typically encountered.

Such a product as described above may be implemented in the form of a gateway, which is a telecommunications device serving as a network node to provide translation or mapping of protocols between different networks, such as between a traditional telephone network and a voice over IP (VoIP) network. An example of such a gateway is the Dialogic 1000 Media Gateway series or the Dialogic 2000 Media Gateway series, which are commercially available from Dialogic Corporation of Montreal, Quebec, Canada.

Referring to FIG. 1, a diagram of a conventional client-server system 100 is illustrated in which a client 102 interacts with a server 112 to exchange information. In system 100, a unit 114 that is representative of a product, such as the above described gateway, includes server 112 as an embedded device. Server 112 includes XML code 116, HTML code 118 and scripting code 120 that can be used to respond to a request from client 102 over network link 110, which can provide connectivity for an HTTP transfer using TCP/IP, as discussed above. System 100 typically operates by having a user interface 104 submit a request to server 112 through a browser 106. Server 112 responds with XML code 116, HTML code 118 and/or scripting code 120, or with documents 111, which may contain XML, HTML or scripting code as well.

Conventionally, documents 111 are provided to browser 106 upon request, and contain information concerning unit 114 to permit a user to interact with and administer unit 114, as discussed above. Documents 111 may be provided to have a unique copy for each supported language that is desired by purchasers, administrators or users of unit 114 in general. A user accessing a language-specific document from documents 111 selects a language and receives the appropriate language-specific document in browser 106.

FIG. 2 illustrates a conventional request/response diagram 200 that shows the process of requesting and receiving a document in an exchange between a client 202 and a server 212. The process operates by a user first requesting a page, or a document, from server 212 in an event 204. A request 206 is generated to server 212. Upon receipt of request 206, server 212 loads the desired page, or document, from storage in event 214. Server 212 then provides a response 216 to client 202 in which the requested page, or document, is transferred to client 202. Upon receipt by client 202, the page, or document, is rendered in a user interface, as shown at event 208.

As part of request 206, the user may specify a particular language in which the requested document should be rendered within browser 106. If the configuration of unit 114 is modified, such as by a new installation, a configuration modification or update to unit 114, documents 111 are updated to also reflect changes to the configuration of unit 114. If not updated to track changes to unit 114, documents 111 may provide incorrect or incomplete information concerning unit 114. Accordingly, each document that is modified may have a number of language-specific document permutations in documents 111 that are also reconfigured and potentially created anew if significant changes are implemented to the configuration of unit 114. Examples of modifications to the configuration of unit 114 include instances where new parameters are available, information is stored in a different location than previously expected, new data structures or controls are introduced, or any other type of configuration change that calls for modification to documents 111. To properly maintain support for a number of different languages, all the language-specific items in documents 111 are modified to reflect changes to each of the base documents for the configuration changes to unit 114 to maintain consistent administrative access to unit 114 across the different supported languages. As discussed above, the exercise of modifying documents 111 to correspond with configuration changes in unit 114 occurs even if the changes to unit 114 are small in number or effect. Such an arrangement can be unwieldy and problematic, also as discussed above.

BRIEF SUMMARY OF THE INVENTION

In accordance with the disclosed system and method, language-related content is decoupled from a document structure or content to permit the document to accept variable language-related content. The language-related content is stored separately from the document structure and content. The document without the language-related content acts like a template that can be populated with any type of language-related content. The language-related content can be provided in a separate file, which may provide all available language-related content for the different supported languages. Alternately, or in addition, language-related content for each of the supported languages can be provided in a separate file specific to a given language. The language-related content can include rendering instructions that are imported into a user interface with the document.

According to one aspect of the disclosed system and method, a language-specific file is delivered from a server to a client before, during or after a requested template document is requested from the server by the client. The language-specific file can be parsed and the parsed language-related content can be stored on the client in a cache or in a document object model (DOM) associated with a user interface. At the client, the template document is scanned for language independent elements using, for example, a script in conjunction with a scripting engine available at the client. The script may be provided to the client as part of the requested template document. A language independent element is a part of the template document that can indicate the use of variable language-related content, as well as a location where the language-related content should be inserted. An identifier associated with a language independent element is used to reference language-related content in the cache or DOM. The language-related content is extracted from the cache or DOM and populated in the template document to form the document, which may then be stored or displayed to the user.

According to one aspect of the disclosed system and method, the language-specific file is implemented in XML code. The language-specific file may be implemented as an XML file. The language-specific XML file is delivered to the client prior to the request from the client to the server for the template document. The XML code or content may be stored in the DOM. When the template document is delivered to the client in response to the submission of a request to the server, HTML and/or scripting code in the template document is scanned for language independent elements that have associated identifiers (IDs), tags or insertion points. Upon detection of such elements, the associated identifiers, tags or insertion points, also referred to herein collectively as language element indicators, are used to search the language-specific XML file for the language-related content matching the language element indicators to be inserted at the specified points in the template document According to another aspect of the disclosed system and method, language independent elements are identified in a document delivered from a server to a client, which elements mark insertion points for language-related content. According to one aspect, a script executes to scan the document for elements marking language insertion points. For example, the scan detects a tag, an ID or an attribute as a language element indicator that identifies an entry in a corresponding language file. The language element indicators detected in the document have identifiers that are used to locate corresponding identifiers in a set of language-related content items. When a match is found for corresponding identifiers in the set of language-related content items, which can be implemented as a language file, the content associated with a matched identifier is extracted from the set of language-related content items and inserted into the matching language element indicator within the document. Once all the language element indicators in the document are populated with matched content found in the language file, if any, the language-related content is stored or displayed within the document on the display for the user interface.

According to another exemplary aspect, the disclosed system and method provides language-related content as pop-up information on the display when an event is triggered that causes pop-up information to be displayed. For example, an event handler may be installed for a mouse cursor or other input device to trigger a pop-up box for displaying pop-up information. For example, a mouse cursor "hovering" over a specified item or location can trigger a pop-up box display that may be used for help or hint information, and that can be populated with content in accordance with the selected language. In such a case, the template document is scanned by a script to detect language element indicators associated with a template document component such as a pushbutton, label and so forth. The script can be configured to install an event handler for the template document component upon detection of a particular type of language element indicator, for example. An event trigger can be selected for a number of events which are well known in the art, such as, for example, when the mouse cursor moves over a given item or location. When the user moves the cursor over the item or location and causes an event trigger, the installed event handler executes to locate the language-related content associated with the pop-up box to be rendered by the event handler. The language-related content associated with the triggered event is found, for example, by searching a corresponding language file for an identifier associated with the language-related content to be inserted in the pop-up box. The identifier associated with the language-related content can be implemented in various forms, such as a tag, ID or attribute associated with the language-related content. If the identifier is found, the associated language-related content is extracted from the language file and populated within the pop-up box.

According to another exemplary aspect, the disclosed system and method provides a centrally managed language server that provides the language-related content. The central language server permits the abstraction of the language element from the content of the web server providing the pages to a client browser. In accordance with an aspect, language-related content from the central language server is delivered to the client workstation in preparation for receipt of a document template that contains language independent elements that are to be populated with language-related content. The document template is obtained from a web server that is separate from the central language server, so that language-related content can be collected centrally, while application specific documents and document templates can be located at a specific server. The developers and administrators of the server applications can thus implement documents, document templates and/or web pages that are specific to the applications embodied in the server, while language-specific content can be developed and administered separately. This arrangement permits central administration of the language-related content, such that updates and maintenance to the language-related content can be conducted in one place at one time, if desired, rather than being propagated and distributed among a number of products, application servers, product locations or server locations.

According to another exemplary aspect, the central language server can determine a selected language based on characteristics of the requests for language-related content. The characteristics for making the determination may include the content of an IP network address of the client workstation and/or transport related parameters, such as HTTP headers. Any other type of location information that can be derived in relation to the client workstation location or a request for language-related content may be used to determine a language selection for providing language-related content to the client workstation. In addition, settings or selections provided from the client workstation may be used to indicate a language selection that may be different from a default language for a given location. The messaging between the client and the central language server may be implemented on a secure basis to prevent message contents from being observed by unintended parties. The central language server may also be implemented to provide responses with language-related content as part of a single file, or on an individual request/response basis.

BRIEF DESCRIPTION OF THE SEVERAL VIEWS OF THE DRAWINGS

The disclosed system and method is described in greater detail below, with reference to the accompanying drawings, in which.

DETAILED DESCRIPTION OF THE INVENTION

The disclosed system and method provides a technique for flexibly implementing a document in a client-server environment in a selected language. A given document provided to a client by a server upon request from the client acts as a template within which language-related content can be populated by the client. Previous documents constructed to be rendered in a client user interface, such as a browser, were constructed to be unique with respect to the configuration of the document and the language of the content within the document. If the structure of the document changed, for example to match a new configuration of a service or device associated with the document, the entire document was reconfigured with the attendant changes to the specific language content that was unique to the document. If a number of languages were to be supported, the changes to the structure of the document would be repeated for each of the documents having a different language.

In accordance with the present disclosure, a language-related content and structure of a document provided by a server are decoupled to permit the document to be rendered in a user interface with a wide degree of flexibility with respect to a language chosen for the content represented in the document. According to an exemplary embodiment, a document template is provided with components arranged to be non-language-specific. The components of the document template include such items such as buttons, tables, text boxes, labels and any other type of control or content with which the user can interact. Embedded in the document template are language independent elements such as tags, IDs or attributes that mark locations for the insertion of content from a language file. A language file is selected by the user when a particular language for the document is selected. For example, the user is prompted to select a language from a list presented in the user interface, and selection of the language causes selection of the particular language file associated with the language selection. Alternately, or in addition, the desired language can be determined from settings in the browser. Various other techniques can be used to permit or cause a language selection as may be apparent to those skilled in the art. A script running in the browser scans the document template for the language independent elements and uses identifiers associated with the elements to conduct searches for the same in the language file. If an identifier match is found, the language-related content with the matching identifier from the language file is inserted into the document template at the appropriate location associated with the appropriate language independent element. The document with the added language-related content may then be rendered by the browser so that the language content can be seamlessly presented in the document in accordance with an intended presentation design.

Figure 1:
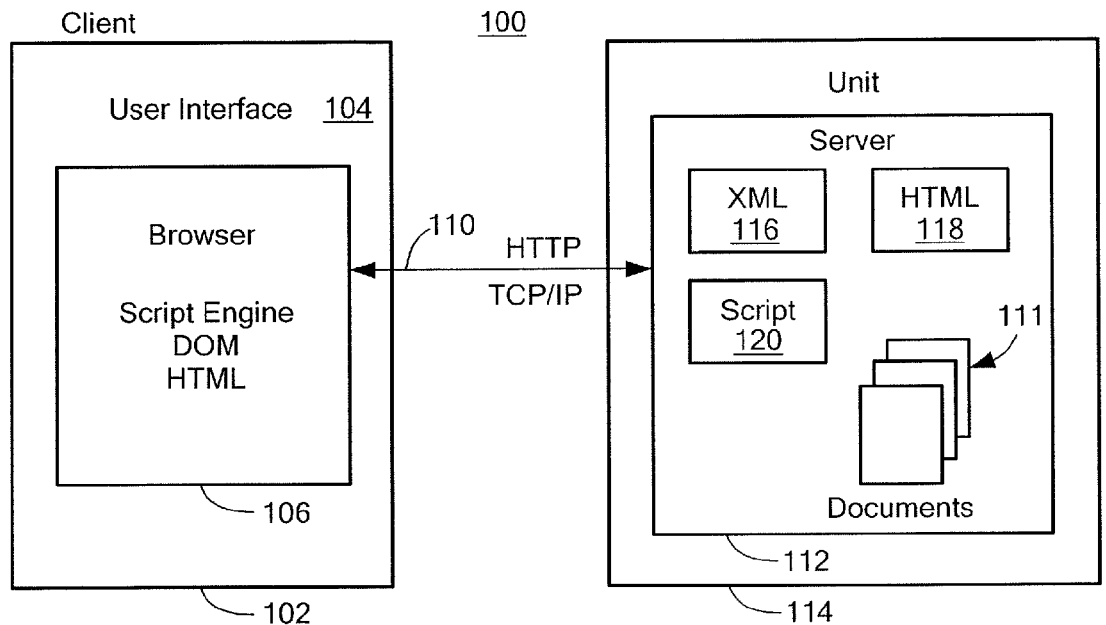
FIG. 1 is a block diagram of a client-server topology arrangement.
Figure 2:
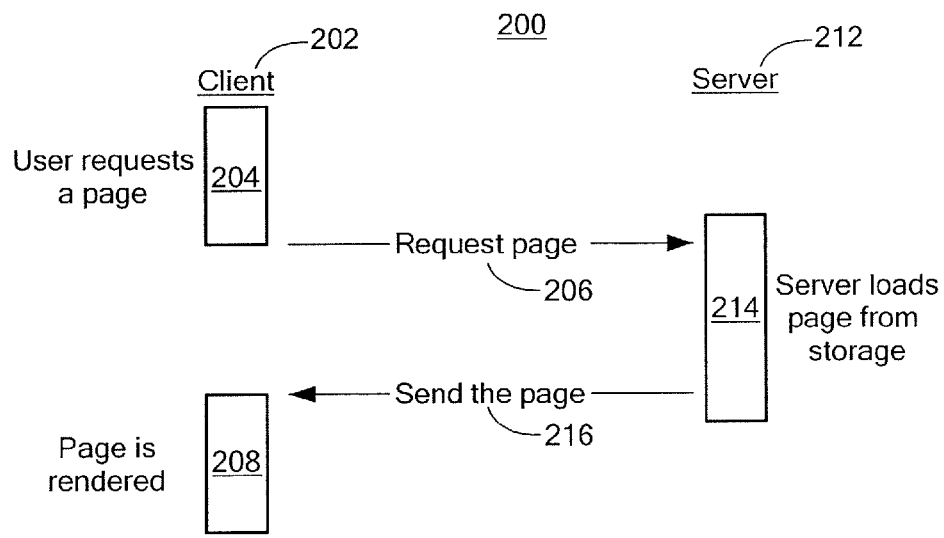
FIG. 2 is a sequence diagram illustrating request and response activity in a client-server environment.
Figure 3:
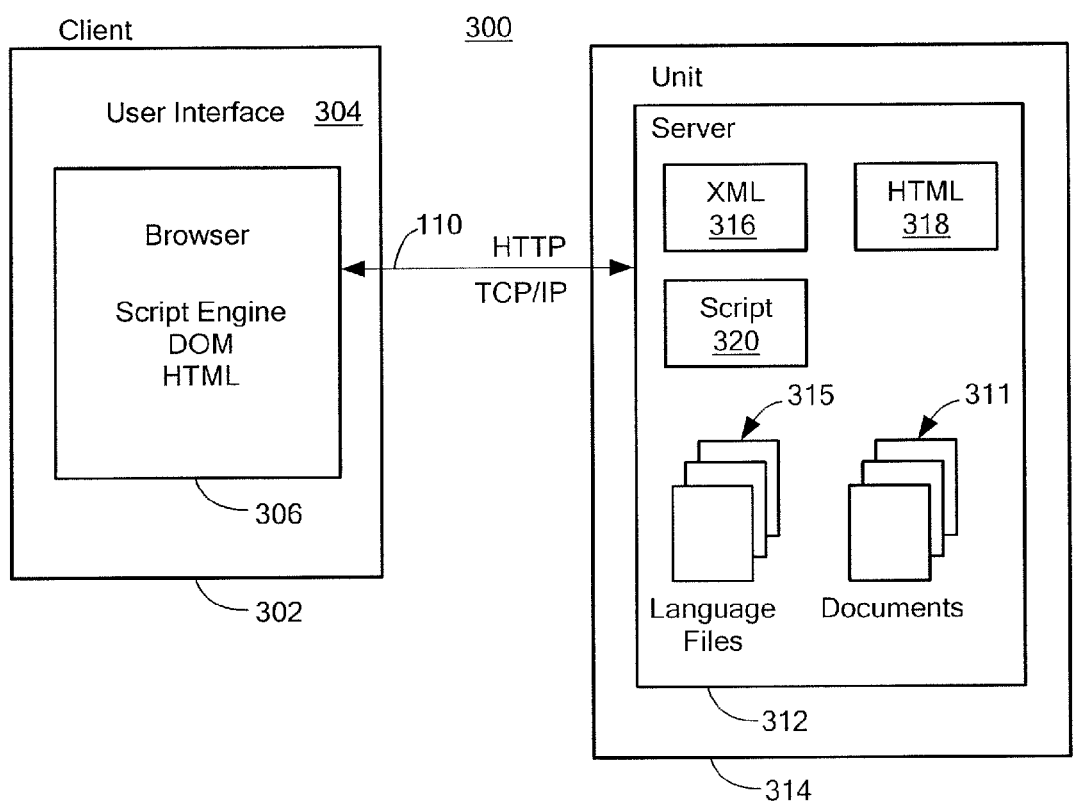
FIG. 3 is a diagram of a client-server environment in accordance with an exemplary embodiment of the disclosed systems and methods.

Referring now to FIG. 3, a diagram of a client-server system 300 is illustrated in which a client 302 interacts with a server 312 to exchange information. Server 312 includes XML code 316, HTML code 318 and scripting code 320 that can be used to respond to a request from client 302 over network link 110. Server 312 also includes separate language files 315 that are used in conjunction with documents 311 to browser 306. Client 302 implements a user interface 304 that may operate in conjunction with a browser 306. Browser 306 can provide a widely accepted means for requesting and receiving content over a network connection, such as is illustrated with network link 110. In compliance with widely accepted conventions, browser 306 can implement a scripting engine that can interpret and execute scripts received over network link 110. Browser 306 also can implement a DOM, in which may be stored XML related code or data. Browser 306 can also interpret and execute HTML code that can be retrieved over network link 110. An operation of system 300 is illustrated with respect to the sequence diagram shown in FIG. 4.

Figure 4:
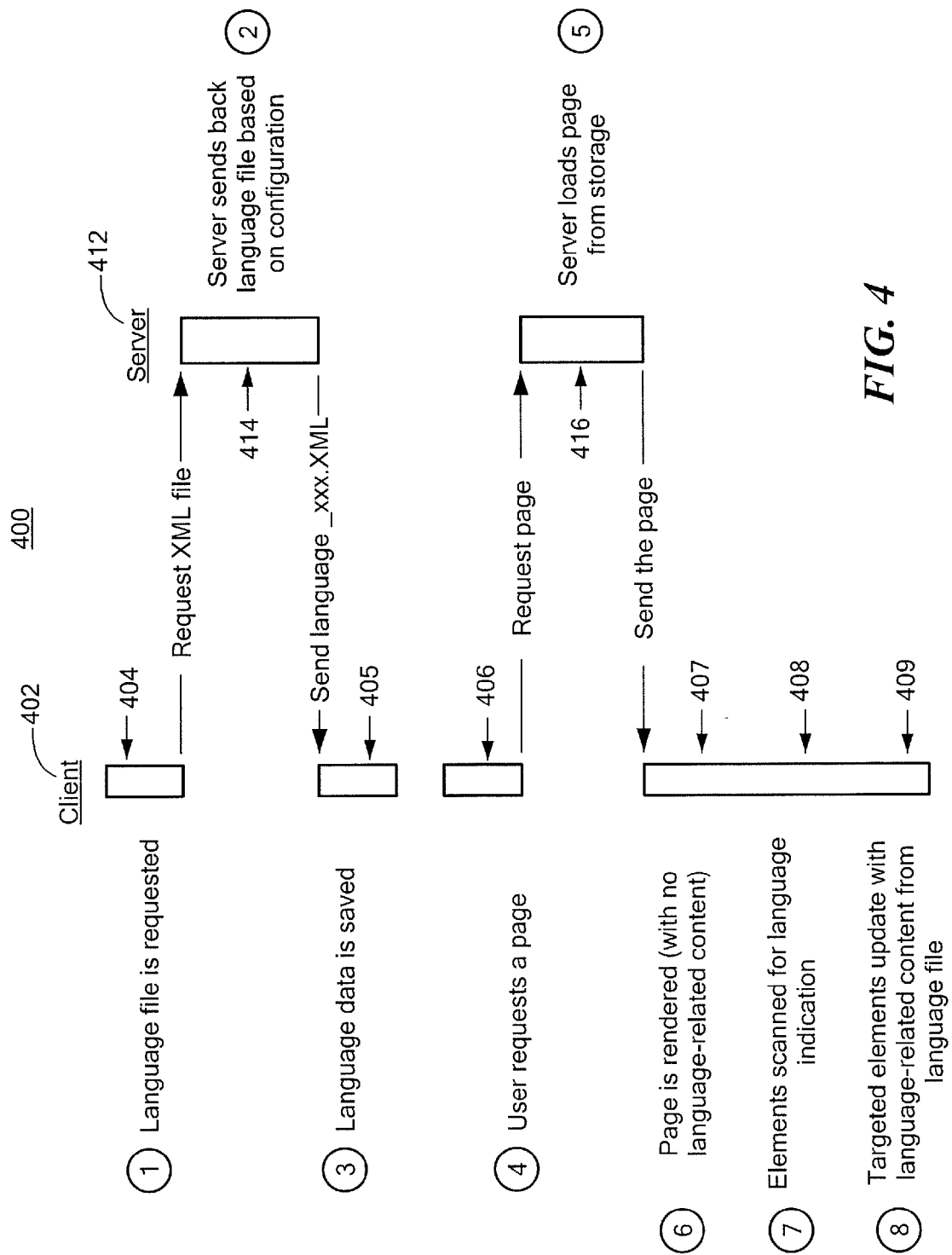
FIG. 4 is a sequence diagram of requests and responses in a client-server environment in accordance with the disclosed systems and methods.

In FIG. 4, a sequence diagram 400 shows interaction between a client 402 and a server 412. A series of events occur on client 402, server 412 or between the two, as indicated by event numerals 1-8. A first event 404 represents a request from client 402 sent to server 412 to obtain a language file. The language file may be an XML file, and may have a name indicative of the language content. For example, an English language file may have a name of "language_English.xml," whereas a German language file may have the name of "language_German.xml." Any type of file construct or organization may be used, as long as the different language-related content items for insertion into a template document can be searched and identified. The actual request of a language file submitted by client 402 can be prompted through a number of techniques, including permitting the user to select a language in user interface 304. Alternatively, or in addition, a desired language for the document to be rendered in user interface 304 can be determined from another source, such as a language setting provided in browser 306. In any case, a request for an appropriate language file is generated from client 402 and submitted to server 412, as indicated with event 404. In the exemplary embodiment of FIG. 4, the language file is implemented as a unique XML file that includes content directed to a single language.

Server 412 receives the request from client 402 and provides the language data to client 402 in a second event 414. In an exemplary embodiment, the language data provided by server 412 in response to the request from client 402 is in the form of an XML file that is static. That is, the returned XML file is composed of predetermined fixed entries. It should be apparent that the language file provided by the server can be dynamic in nature, in that language-related content entries in a given language can be composed through a translation engine, for example. Alternatively, or in addition, the language-related content entries can include coded instructions, such as HTML coded rendering instructions. In the embodiment in FIG. 4, the language file is a static file with predetermined fixed text content, which is loaded from an internal file system (not shown) provided in server 412. The language file is returned to client 402, and may have a predetermined naming convention, such as "language_xxx.xml," where the "xxx" portion is a term identifying a particular language associated with the language file sent from server 412. In a third event 405, client 402 receives the XML language file and saves the file locally for later access. If client 402 is equipped with a cache, the XML language file can be stored in such a cache for quick access during document rendering to reduce overall display latency. Alternately, or in addition, the language-related content from the XML language file can be parsed and stored in a cache or a DOM associated with the user interface.

A fourth event 406 indicates a request from a user submitted to server 412 for a document or page to obtain the desired document rendered in user interface 304 with the desired language. It should be noted that in event 406, the request submitted by the user may prompt a request for the XML language file. The XML language file can be sent before, along with, or after the document template is requested and returned to client 402. According to an exemplary embodiment, event 406 occurs with a user requesting a configuration or status page for unit 314. With such a configuration or status page, the user can configure unit 314 or obtain parameter value information to monitor operation of unit 314. For example, unit 314 can be a gateway, as discussed previously, which can be administered remotely with a configuration or status document provided by server 312 over an internet connection to a remote client 302. Because such a gateway can be implemented in various locations on a worldwide basis, the configuration or status document associated with the gateway should be understandable in a number of different languages. The presently disclosed system and method solves the challenge of administering a large number of configuration or status documents associated with a potentially large number of gateways in a large number of supported languages.

In a fifth event 416, server 412 receives the request from client 402 originated by event 406 and looks up the requested document in the file system (not shown) with which server 312 is provided. The document corresponding to the request from client 402 is retrieved from storage and sent to client 402. Alternately, or in addition, the document corresponding to the request from client 402 can be generated by server 312 on a dynamic basis. For example, depending upon the content that is sought in conjunction with the request from client 402, a document can be configured to provide a specified structure, to include language independent elements that can be completed with language-related content by client 402. In accordance with an exemplary embodiment, server 412 provides a template document that includes language independent elements, which can be detected upon the template document being scanned, such as by a script operating in browser 306. The template document generally has provisions for storing or visually representing the desired features, information, or controls available in observing or configuring unit 314. The template document returned from server 412 does not necessarily include any language-related content that will be stored or presented to the user through browser 306. For example, the template document may include an HTML specification for a table with a certain number of rows and columns. The usual entries for text to define a table title, column or row headings, or other text information associated with the table, are instead identified with language independent elements, which have identifiers that may match the identifiers of corresponding text items in an associated XML language file. The components in the template document that are to have language independent text are typically identified and provided by a developer who creates the template document.

In a sixth event 407, client 402 receives and renders the template document in browser 306. The template document may be rendered without language-related content that would be dependent upon a language selected by the user. In addition, the template document may be rendered in a background environment, so that it is not initially displayed in browser 306. Browser 306 renders the template document by interpreting the rendering instructions provided with the template document. The rendering instructions cause the browser to construct the components of the template document with appropriate attributes. Components may include such items as pictures, push buttons, radio buttons, labels, menus, drop down boxes, text boxes, and any other type of component or control that can be represented with the rendering instructions. The component attributes may be, for example, color, size or location on a display screen, component functional capability, and other attributes of the components to permit interaction with the user through the user interface. The rendering of the template document in event 407 provides for the rendering of each of the components in accordance with the rendering instructions, and without language-related content items that can be associated with the components. The language-related content items are provided to the components separately, to reflect the language selection.

In a seventh event 408, a script, such as may be provided with script code 320, scans the constituent parts of the template document for language independent elements during or after the loading or rendering process. The language independent elements indicate that language-related content should be inserted into corresponding components in the template document, such as into text or symbol variables or other types of media placeholders within the language independent elements provided within the template document, for example. Each of the language independent elements identified in the scan of the template document has an associated identifier that can be used to prompt a look-up of language-related content that also has an associated identifier. The language-related content can be stored in a language file, a cache or a DOM, for example.

An eighth event 409 provides for the look-up of the language-related content items associated with the language independent elements identified during the scan of the template document. The script executing within browser 306 accesses the language-related content items downloaded in event 405, wherever they are stored. For example, the language-related content items may be parsed and stored in a cache or in a DOM associated with the user interface. The exemplary embodiment of a language file is used in the following discussion, and is provided as an example that is inclusive of language-related content items stored in a cache or in a DOM.

In the case of the language-related content items being stored in a language file, the script looks for a file with the naming convention of "language_xxx.xml" where xxx can be any predefined term indicating a particular language. As an example, the "xxx" term can be provided as such terms as "English," "Spanish" or "German" to indicate the respective language text items contained within the language file. Alternately, or in addition, the term "xxx" can be provided with a native language identifier, such as "Français" or "Deutsch" for French and German, respectively.

The script looks through the language file for entries with identifiers that match the identifiers associated with the language independent elements detected in the scan of the template document. The search may be conducted based on, for example, an identifier implemented as a tag, an ID or attribute that is associated with the language-related content item in the language file. If the script locates an identifier in the language file that matches the identifier from a language independent element found in the scan, the language-related content associated with the matched entry is extracted from the language file and inserted into the template document in the appropriate variable, such as in the language independent element or component location. The results of the script search through the language file may be dynamic in nature, where depending upon certain settings in the template document, client or language file, some language-related content may be extracted or selected over other language-related content. For example, client 402 may provide a setting for a "verbose mode" to indicate that a particular selection of language-related content should be extracted from the language file for a given language element in the template document. The setting for "verbose mode" may retrieve an expanded language-related content for a language element, as opposed to a setting for "summary mode," which may retrieve an abbreviated language-related content from the language file for the language element in the template document.

The process continues until all language elements identified in the template document have been searched in the associated language file for language-related content items to be inserted into appropriate variables or placeholders in the template document.

In the case of text items stored in a cache or DOM, the search for an identifier among the text items that matches the identifier from a detected language independent element is conducted in the cache or DOM, respectively. The same mechanism described above is used to extract text from text items matching the language independent element and to insert the text in a desired location within the template document.

After all language elements in the template document have been identified and processed as discussed above, the document is complete for display purposes, and can be stored or provided to a display of user interface 304 for viewing by the user. According to an exemplary embodiment, the template document may be rendered and displayed to the user without text. The language-related content extracted from the identified text items may then be provided to the appropriate location on the display as determined by the language independent elements and component attributes or construction as the rendered template document is scanned by an executing script. Alternately, the entire document with visual constructs and language-related content can be displayed to the user after it is fully constructed, such as may be achieved in a background mode, and ready for display to the user.

The language-related content items provided in the language file, cache or DOM can be any type of representation of information that is meaningful to the user in the context of the user's language. For example, the language-related content may include text, alphanumeric characters, symbols, icons, indicators, indicia, audio, images, video, formatting instructions, such as left-to-right or right-to-left text orientation, formatting queues, tactile media representations, or any other type of media representation that may be provided in the document. In addition, the language-related content items can be any type of HTML code, for example, such as HTML code used to generate text or other language-related content as discussed above. The use of HTML code in a language-related content item enables the fully rendered document to support language representations that include, for example, symbols, right-to-left reading, or other conventions as may be used in the various languages encountered around the globe.

The following example provides portions of an XML file and an HTML file, representing the language file and template document, respectively. The following illustrative code samples show an exemplary embodiment of a link between HTML code representing components of the template document and the language file as an XML file containing text as the language-related content.

EXAMPLE

A language-specific XML language file:

```
<?xml version="1.0"?>
<lang attrLang='english'>
  <SettingsTableText>
    <label><![CDATA[<b>Main</b> Settings Configuration]]></label>
    <help><![CDATA[Any <i>HTML</i> data can go here]]></help>
  </SettingsTableText>
  <CarColor>
    <label>Enter the color for your car</label>
    <help>The car can be blue or red</help>
  </CarColor >
</lang>
```

A portion of an HTML file with language independent elements that reference the language file:

```
<table>
  <tr>
    <th id="Label:SettingsTableText"> </th>
  </tr>
  <tr>
    <td id="Label:CarColor"> </td>
    <td><input type='text' /></td>
  </tr>
</table>
```

In the above example, the language is English, as indicated in the second line of the XML language file. The HTML file includes a place holder blank, " " that is used as the variable in the language independent element identified with the <th> tag as a table header. The place holder blank is replaced with the term "Main Settings Configuration" drawn from the XML file in the above example. The replacement is achieved by using a script to scan and detect the language independent element with the identifier "Label: SettingsTableText," which identifier is used to search the XML file. The matching identifier is located on the third line of the XML file, and the language-related content associated with the matched identifier in the XML file is extracted for insertion into the HTML file. The content of the square brackets following the CDATA keyword is HTML code embedded within the XML file, and is not interpreted or rendered as HTML code until inserted into the template document, replacing blank placeholder following the identifier "Label: SettingsTableText." Accordingly, the text "Main Settings Configuration" has the word "Main" rendered in bold when the text is inserted into the HTML file in accordance with the HTML code provided in the XML file for the table header language-related content item.

Any type of language-related content can be provided in the XML file to be used to populate a template document for display to the user in relation to a desired language. With this configuration, the HTML file can be constructed and implemented on a one-time basis, with variations in supported languages being provided through the appropriately selected language file. In the exemplary embodiment above, the language independent element in the HTML file has an identifier that matches a corresponding identifier in the XML file. The script scanning the HTML file uses the identifier with the "Label:" notation to search for a match in the XML file. The matched identifier in the XML file references the desired language-related content items to be inserted into the HTML file in the placeholder blank associated with the language independent element.

As illustrated in the above example, the language file can have tags, IDs or attributes that can be found with reference to language independent elements in the template document. The above discussed architecture permits language and component construction to be disassociated or decoupled. By separating language-related content from a document construct and components in the document, greater flexibility in reconfiguring the document is gained. If the HTML file is reconfigured, for example, to correspond with configuration changes in unit 314, such a reconfiguration can be done on a one-time basis. The reconfigured HTML file continues to operate properly with the supported language files without necessarily requiring additional maintenance efforts. Accordingly, further language translations to implement a multi-language support for viewing a status or changing a configuration of unit 314 can be limited in scope.

One area in which the disclosed system and method can be highly advantageous is where a document includes pop-up boxes that are used to display pop-up data based on the triggering of a predetermined event. For example, if user interface 304 includes a display with a mouse cursor that can be manipulated by a user moving a mouse, the position of the mouse cursor can be used as a specified event to trigger a response that was previously defined within the displayed document. A common example of this type of pop-up provision is provided in the case where the mouse cursor is maintained in a position, or hovers, over an underlying document component that is provisioned with an event detector for detecting a hovering mouse cursor. If the event detector is triggered by a hovering mouse cursor, a pop-up box can be displayed with language-related content that provides information to the user. This type of pop-up data is often provided in the context of help or hints to the user when the user causes the mouse cursor to hover over the component of interest.

According to an exemplary embodiment of the disclosed system and method, a content of such a pop-up box as discussed above can be provided for any supported language without requiring a reconfiguration of the document. For example, referring to the above example, the XML file includes a tag identifier <help> to identify language-related content items that should appear when a pop-up box event is triggered.

Figure 5:
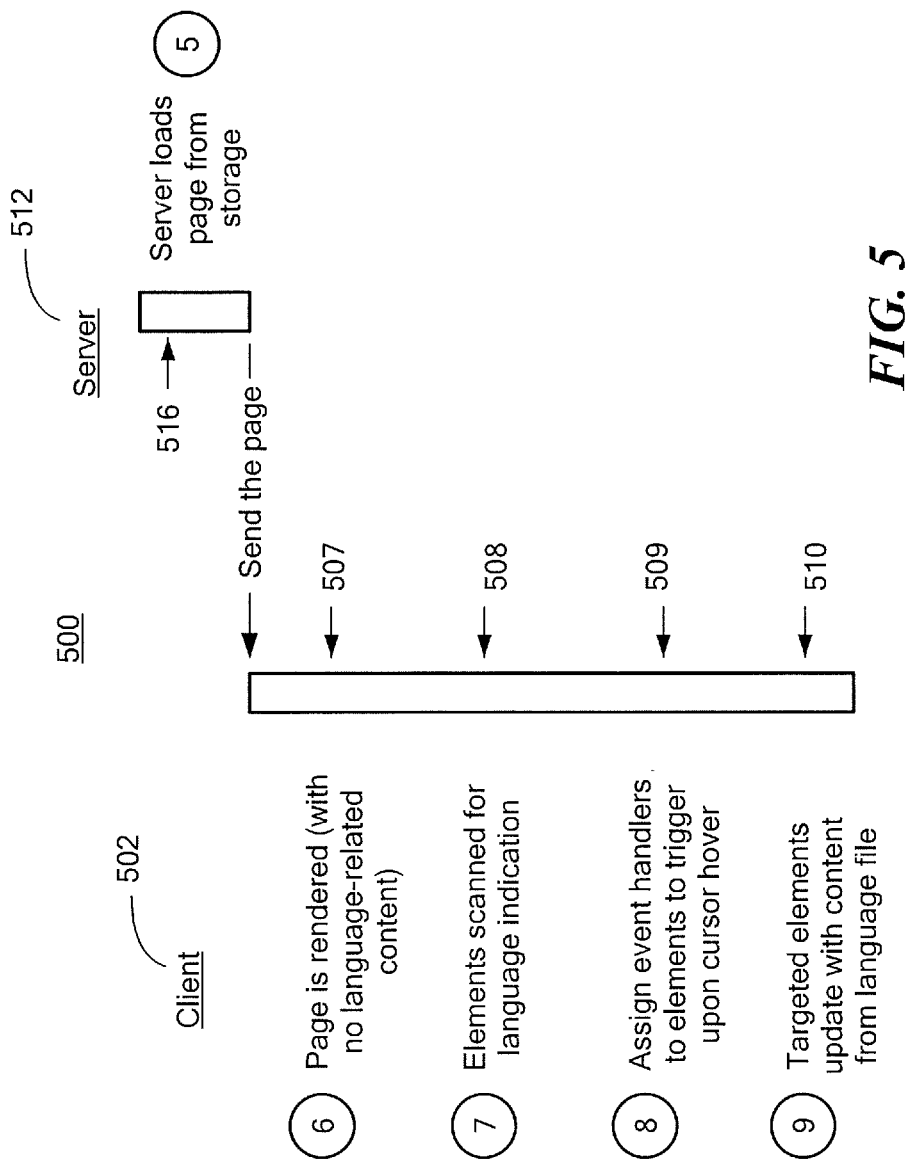
FIG. 5 is a sequence diagram of a client-server environment in accordance with another exemplary embodiment of the disclosed systems and methods.

Referring now to FIG. 5, a sequence diagram 500 illustrates events that can occur to provide support for pop-up boxes with language-related content entries in a supported language selected by the user. Portions of diagram 500 are based in part on diagram 400 shown in FIG. 4, and continue with a fifth event 516 corresponding to fifth event 416 illustrated in FIG. 4. As with event 416, event 516 is a look-up of a requested document or page by server 512 in a server file system (not shown). Diagram 500 presumes that a client 502 has stored or parsed a language file corresponding to the document or page being requested by client 502. Server 512 obtains or generates the requested template document in event 516, and returns the template document to client 502. The template document has one or more language independent elements that are associated with document components constructed for display in the user interface. The components are typically implemented as objects that have associated methods, some of which provide for detection of an event in the user interface. Upon detection of an event, the component object may provide a method for handling the event, such method causing a pop-up box to be rendered in the browser with a particular language-related content. Initially, the template document retrieved from server 512 may or may not have event handlers installed for the document components. A sixth event 507 provides for the rendering of the template document or page retrieved from server 512. The rendered template document or page has language independent elements, such that the document components are rendered without being populated with language-related content.

A seventh event 508 occurs with a script scanning the template document for language independent elements that, when detected, prompt a look-up for corresponding language-related content items. In the above example, a table heading and table data are identified as language independent elements by the script scan of the HTML file with the entries of <th id="Label:SettingsTableText"> </th> and
<td id="Label:CarColor"> </td>.

The detection of the above language independent elements in event 508 prompts the script to look up corresponding language-related content items in the associated language file and provide that language-related content to the language independent items. In addition, the script is configured to assign an event handler to each language independent element detected in the template document for which a pop-up action should occur.

The script that executes to scan the template document for language elements can also provide a number of other functions in relation to installing support for pop-up data. An eighth event 509 illustrates the activity of the script in assigning event handlers to selected components in the template document for which pop-up support is to be provided. Using the above example of the portion of the HTML file, the language elements <th id="Label:SettingsTableText"> </th> and
<td id="Label:CarColor"> </td> indicate to the executing script that pop-up data event handlers should be assigned to the respective table header and table data components of the template document. The script then executes to install an API (Application Programming Interface) call in the table header and table data components, with the API being triggered based on defined events within the respective components. In an exemplary embodiment, an API is installed to be activated upon a mouse-over or hover for the table header and table data components. The respective components detect the event and trigger the event handler, that is, the installed API. If the user has a mouse cursor that hovers over the table header or the table data so that a mouse-over or hover event is detected, the installed API is triggered and begins to render a pop-up box. The API uses the language-related content items extracted from the XML language file to populate the pop-up box. In the above example, text items associated with the <help> tags are used for insertion into a pop-up box by the API, which pop-up box is then presented to the user through the display of user interface 304, for example. The text items in the above example are:

Any <i>HTML</i> data can go here; and

The car can be blue or red as extracted from the <help> tags in the above XML file example.

Accordingly, event 509 in FIG. 5 does not necessarily cause the insertion of a language-related content item into a component displayed in the document, but provides a mechanism for referencing the language-related content upon the triggering of a specified event. It should be apparent that any kind of available event may be used to cause a component to be populated with one or more language-related content items extracted from the language file for the supported language. For example, events such as double clicking, right clicking, left clicking or simultaneous left and right clicking with respect to mouse activities can all be assigned to have an event handler to cause a given component to be populated with one or more language-related content items from the language file.

Figure 6:
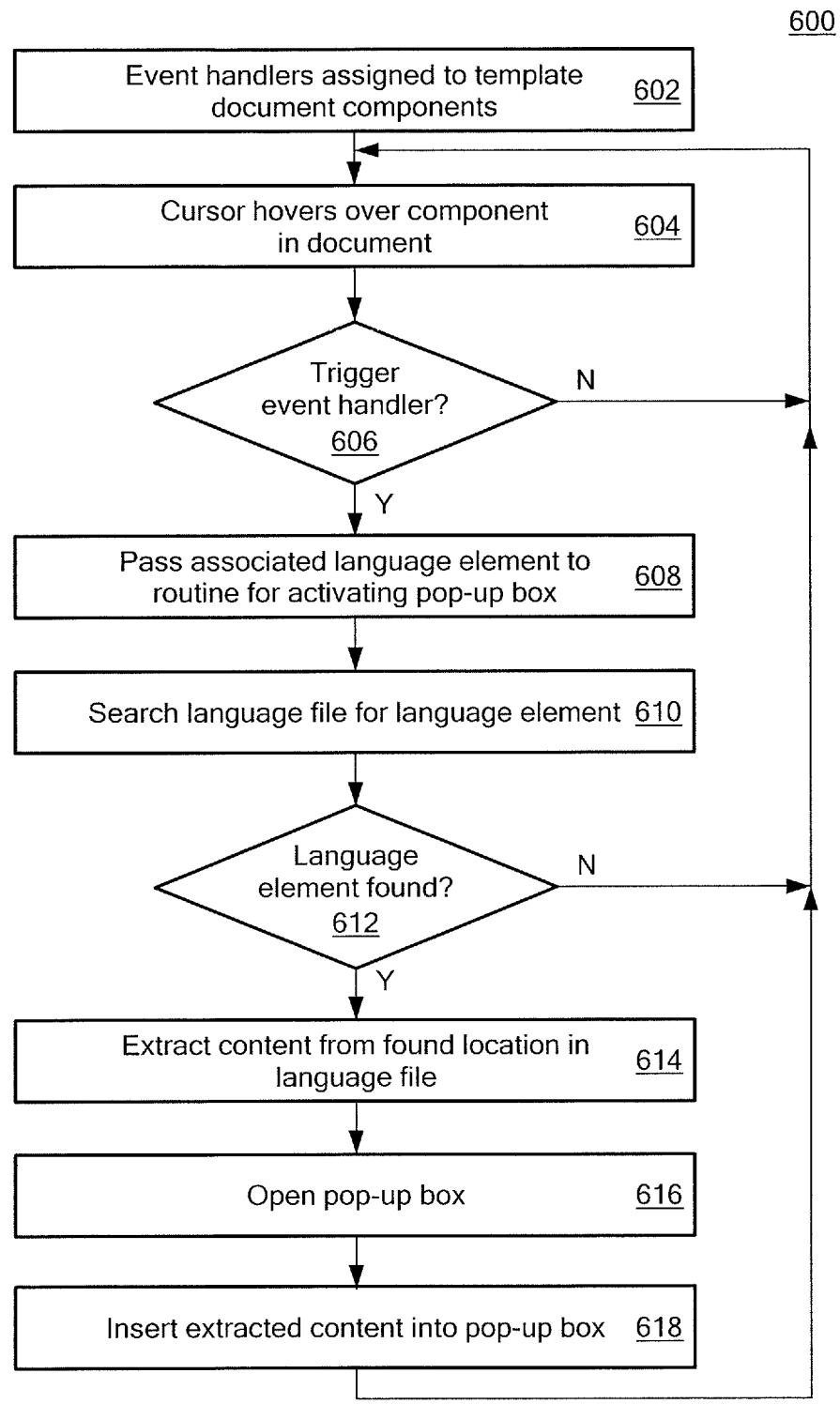
FIG. 6 is a flow chart illustrating a process for implementing a language dependent pop-up box in accordance with the disclosed systems and methods.

Referring now to FIG. 6, a flow chart 600 illustrates a process for implementing a pop-up box that is populated with one or more language-related content items extracted from a language file for a supported language. Box 602 illustrates the assignment of event handlers to template document components when the script scans the template document, as discussed above. In block 604, an activity of a user is indicated, such as the user causing a mouse cursor to hover over a component in the document, for which component an event handler has been previously installed. In decision block 606, a determination is made within the component rendered in the browser, for example, as to whether an event has occurred for which an event handler has been installed in the component. If the component determines that the specified event has occurred, the event handler is triggered with processing along the YES path exiting decision block 606. If the component determines that an event has not occurred to cause triggering of an event handler, processing proceeds along the NO path, which resumes a waiting state in which the component looks for the occurrence of further events.

In block 608, upon the triggering of the event handler, such as the execution of an API that is installed in the component for execution when the component determines an event has occurred, the component passes the tag, ID or attribute associated with the language independent element for which the event handler was installed to permit language-related content to be located for insertion into the pop-up box. In block 610, the event handler routine, such as the API, searches the XML language file for the tag, ID or attribute that was passed to it from the component event handler. In decision block 612, the API determines whether a match for the language element of the document is found within the XML language file. If no match is found, the API does not provide any language-related content in the pop-up box, and may omit displaying the pop-up box altogether. This activity is reflected by the NO processing path taken from decision block 612, which causes the component to return to a waiting state, looking for further events.

If a language-related content item match is found in the language file for the language independent element in the document, the YES path is taking from decision block 612, whereupon the language-related content item is extracted from the matched entry in the language file, as illustrated in block 614. In block 616, the API opens the pop-up box for display to the user in accordance with the characteristics defined by the API for the pop-up box. As an example of defined characteristics, the API may provide an icon or symbolic information, such as a warning sign, in conjunction with text supplied from the language file for display to the user. Alternately, or in addition, the language file may supply language-related content that may include such iconic or symbolic information for display in the pop-up box. Any number of types of functions may be implemented using an API, including the display of menus, peripheral functions such as printing, audio alerts, or any other functionality that can be implemented using an API with client 302, for example. In the exemplary embodiment illustrated in flow chart 600, extracted language-related content taken from the language file is inserted into a pop-up box constructed by the API for display to the user, as illustrated in block 618. After the pop-up box is displayed as indicated in blocks 616 and 618, another event may be provided for the removal of the box and associated language-related content from the display, such as moving the mouse cursor off of the component, or the expiration of a certain time interval. The behavior of the event detection in the component can indicate how the event is to be triggered, and also how the results of an event trigger are handled, for example. In any case, the component returns to a waiting state where the component looks for the occurrence of various events for which event handlers have been installed.

In an exemplary embodiment, a pop-up box can be built in the browser, such as in the DOM, which includes the language-related content, during an initialization phase for a template document. A number of component types, including pop-up boxes can be rendered with language-related content and stored for later retrieval and use in a display. Such an arrangement avoids having a script scan for language-related content in a language file upon the triggering of an event handler. That is, the language file can be scanned once and the appropriate language-related content can be stored in the DOM, for example, to be used for display as desired in accordance with the arrangement of the template document and its components.

Figure 7:
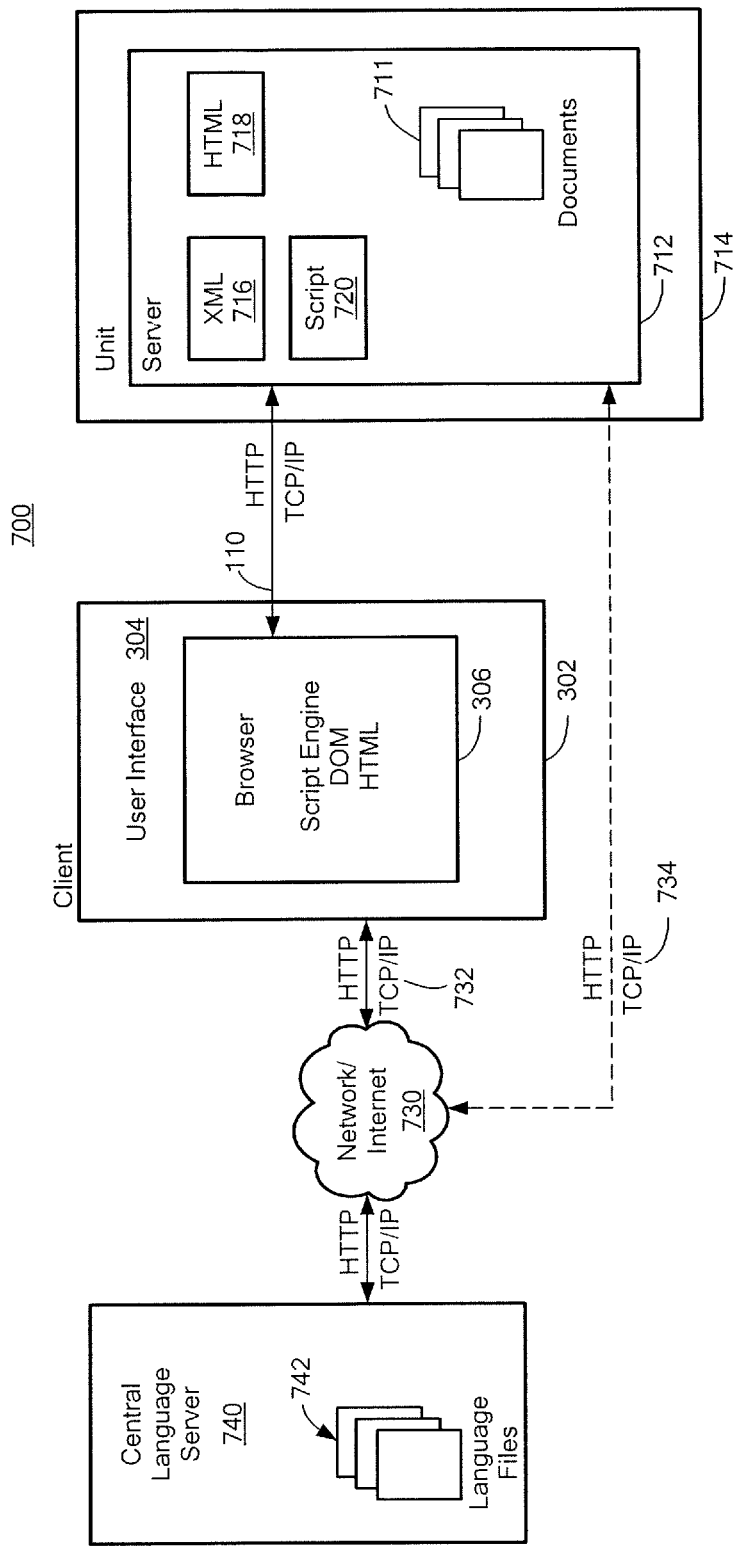
FIG. 7 is a block diagram of a client-server environment in accordance with an exemplary embodiment of the disclosed systems and methods.

In another exemplary embodiment of the present disclosure, language-related content is located in a central language server, which may be physically remote from the web page server. Referring now to FIG. 7, which is a modified version of FIG. 3, a diagram of an exemplary client-server system 700 is illustrated in which client 302 interacts with a server 712 to exchange information. Server 712 is housed in a unit 714 that may be any type of device that can be accessed and potentially configured through server 712. In an exemplary embodiment, unit 714 is an integrated media gateway that provides protocol and signal translation between telecommunication networks. Server 712 includes XML code 716, HTML code 718 and scripting code 720 that can be used to respond to a request from client 302 over network link 110. Server 712 also houses documents 711, which are document templates that may include language independent elements that indicate a placeholder for insertion of language-related content. Client 302 also interacts with a central language server 740 through a network 730 that may be implemented as a communications network, such as an internet or intranet, or that may be implemented as a one or more interconnected file servers or database servers, for example. A communication link 732 between client 302 and language server 740 through network 730 may be implemented as TCP/IP communication protocol links using HTTP or other suitable transport protocols, similar to network link 110. Language server 740 stores language files 742 in a centralized location, to permit general or worldwide access to language files 742 through network 730.

According to an exemplary embodiment, server 712 may initiate requests to language server 740 for language-related content, and insert such content into a document template housed in server 712 for delivery to client 302. In such an embodiment, server 712 provides requests through network 730 over communication link 734 to language server 740 for language-related content. Language server 740 processes the requests from server 712 and returns the requested language-related content via communication link 734, which language-related content may be provided in one or more language files 742. Server 712 then inserts the language-related content into a document template, such as may be provided in documents 711, in accordance with language independent elements in the document template. The so processed document is then provided to client 302 upon request. According to such an embodiment, server 712 performs tasks that are described in other embodiments herein as being performed by client 302. In such a configuration, client 302 supplies a request to server 712 and receives the already constructed document with the inserted language-related content. Such an embodiment, like those where client 302 provides the request for language-related content, benefits from having the language-related content located at a centralized location on language server 740, where it can be more easily managed and maintained. Since embodiments provided herein generally describe client 302 as locating language independent elements in a document, making language-related content requests to a language server, receiving language-related content from the server and inserting such content into a document template for rendering in a user interface, a redundant discussion of server 712 performing those tasks is not repeated, with the understanding that server 712 can carry out those tasks described herein as being performed by client 302. An exemplary operation of system 700 where client 302 performs the above discussed tasks using communication link 732 is described below with respect to the sequence diagram shown in FIG. 8.

Figure 8:
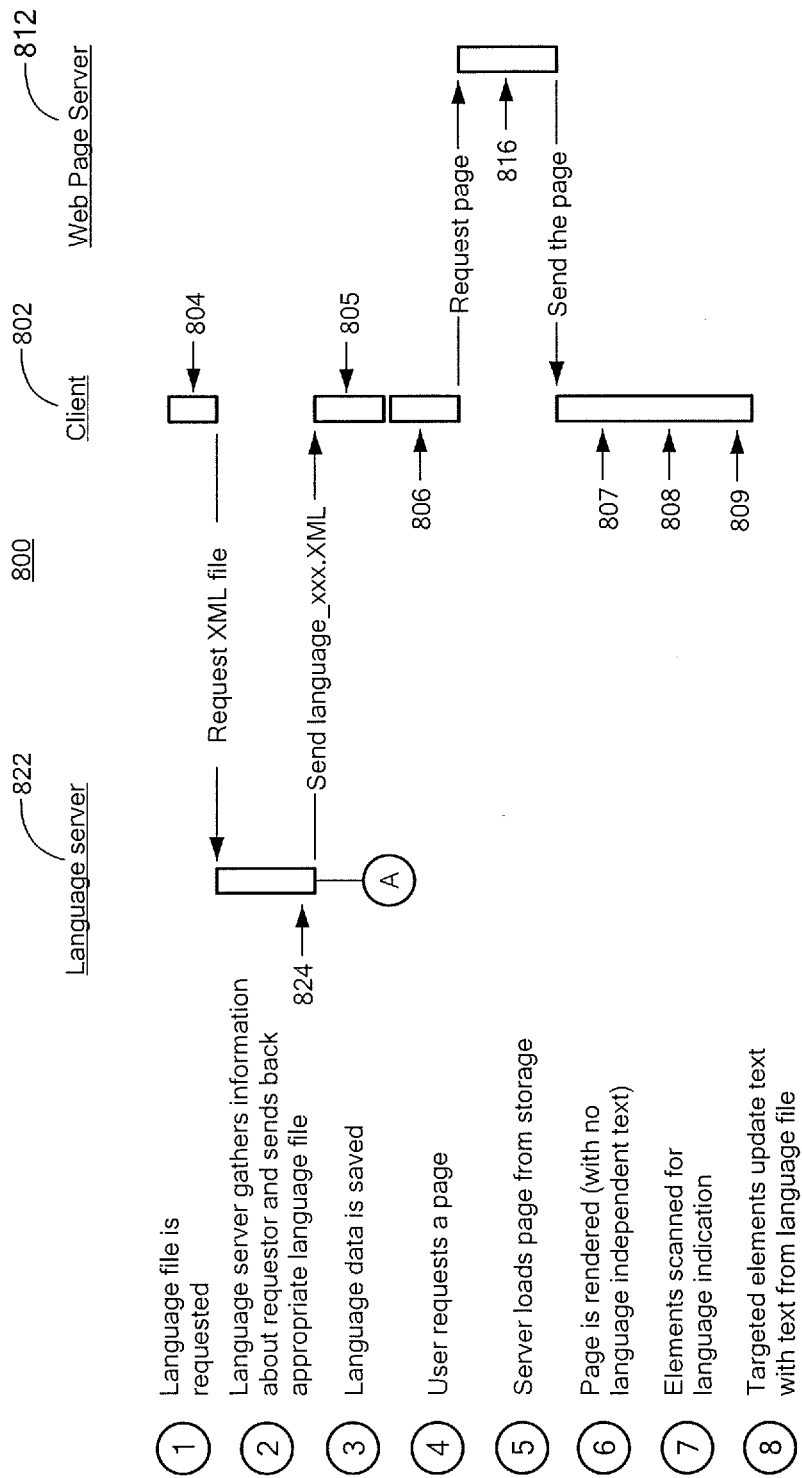
FIG. 8 is a sequence diagram of requests and responses in a client-server environment in accordance with an exemplary embodiment of the disclosed systems and methods.

In FIG. 8, a sequence diagram 800 shows exemplary interaction between a language server 822, a client 802 and a server 812, which may respectively be implemented as central language server 740, client 302 and server 712 illustrated in FIG. 7. Although FIG. 8 illustrates a sequence of events where a language file is obtained, a document with language independent elements is obtained and scanned, and then the language-related content is inserted into the document template, which is then rendered in a user interface, other sequences are readily available. For example, a document with language independent elements can be obtained and scanned, followed by retrieval of a language file or language-related content that is then inserted into the document, which is then rendered in a user interface.

In FIG. 8, a series of events occur on language server 822, client 802, server 812 or between any of these, as indicated by event designations 1-8 and A. A first event 804 represents a request from client 802 sent to language server 822 to obtain a language file. For example, the language file may be an XML file, and may have a name indicative of the language content. For instance, an English language file may have a name of "language_English.xml," whereas a German language file may have the name of "language_German.xml." Any type of file construct or organization may be used, as long as the different language-related content items for insertion into a template document can be searched and identified.

The request for a language file from client 802 to language server 822 can be implemented on a secure basis. For example, the request may utilize asymmetric public/private key pair encryption, symmetric encryption, a hash based on a hashing algorithm, or a digital signature or certificate. In the case of the asymmetrical key pair, the public key and the private key may respectively be used to encrypt the request at client 802 and decrypt the request at language server 822. In such a scenario, client 802 possesses a public key used to encrypt the request prior to transmission to language server 822. Language server 822 possesses a corresponding private key to decrypt the request and obtain the language-related content indicated in the request. A response to client 802 from language server 822 may also be secured through corresponding techniques, such as may be obtained through the use of a digital signature.

When the request is received, language server 822 gathers information about the request, including characteristics of the requestor, the message and/or the transmission of the message to determine a language selection for the response. The characteristics that may be examined in relation to the request may include but are not limited to the IP address of the client, HTTP headers in the request, a routing history, or other indications that may tend to determine a location or language associated with the request. By determining a selected language from the various parameters and characteristics of the request, language selection can take place on an automatic basis, rather than being determined by an explicit selection by a user interacting with client 302. However, the request may include an explicit selection of a desired language, which may be processed alone or in conjunction with various other request parameters or characteristics to select a language. For example, a user may request French language-related content, which can be the basis for determining the language selection alone. However, additional parameters or characteristics examined in the request by language server 822 may place the location of client 302 in Canada, whereby French Canadian language-related content may be provided in the response. The request or parameters or characteristics associated with the request can be stored on language server 822 to aid in providing feedback on the language content or tracking usage of language server 822.

The determination of a language selection on the basis of parameters or characteristics associated with a request may also assist in permitting the request to represent a single or a small number of language independent elements in a web page that is to be rendered. For example, as a web page is being loaded and scanned for language independent elements, the identification of each language independent element may prompt a request to language server 822. Language server 822 can then return responses on the basis of explicit language selection and/or parameters or characteristics associated with the request to determine a language selection for one or more language independent elements referenced in the request. In this way, multiple types of language responses may be provided on an ongoing basis while the document is being rendered, rather than delivering one or more language files to client 802. In the exemplary embodiment of FIG. 8, language server 822 stores a language file that is implemented as a unique XML file that includes content directed to a single language.

Language server 822 receives the request from client 802 and provides the language data to client 802 in a second event 824. In an exemplary embodiment, the language data provided by language server 822 in response to the request from client 802 is in the form of an XML file that is static, e.g., the returned XML file is composed of predetermined fixed entries. It should be apparent that the language file provided by the server can be dynamic in nature, in that language-related content entries in a given language can be composed through a translation engine, for example. An exemplary usage for such a configuration is to provide a request to language server 822 that includes an identifier and a string to be translated. Language server 822 then provides a response with a translated string that is inserted into a language independent element at client 802. Alternately, or in addition, the language-related content entries can include coded instructions, such as HTML coded rendering instructions.

In the exemplary embodiment depicted in FIG. 8, the language file is a static file with predetermined fixed text content, which is loaded from an internal file system (not shown) provided in language server 822. The language file is returned to client 802, and may have a predetermined naming convention, such as "language_xxx.xml," where the "xxx" portion is a term identifying a particular language associated with the language file sent from language server 822.

In a third event 805, client 802 receives the XML language file and saves the file locally for later access. If client 802 is equipped with a cache, the XML language file can be stored in such a cache for quick access during document rendering to reduce overall display latency. Alternately, or in addition, the language-related content from the XML language file can be parsed and stored in a cache or a DOM associated with the user interface.

When the language data is provided to client 802 in event 824, language server 822 continues to obtain language selection information related to the requestor or the request to update language files 742 (FIG. 7) or a language database (not shown) maintained by language server 822. This ongoing update process can be responsive to language product feedback, including comments, questions or suggestions for language-related content or language databases. For example, a facility may be provided to permit feedback that includes reports of errors in the language content or requests for more complete or descriptive text. These operations, represented by event A, can continue after language content is returned to client 802 so that the potential for tracking requests and receiving feedback or gathering language related information can continue to improve the language services offered by language server 822.

A fourth event 806 indicates a request from a user submitted to server 812 for a document or page to obtain the desired document rendered at client 802 with the desired language. It should be noted that in event 806, the request submitted by the user may prompt a request to language server 822 for the XML language file. The XML language file can be sent before, along with, or after the document template is requested and returned to client 802. According to an exemplary embodiment, event 806 occurs upon a user requesting a configuration or status page for unit 714 (FIG. 7). With such a configuration or status page, the user can configure unit 714 or obtain parameter value information to monitor operation of unit 714.

In a fifth event 816, server 812 receives the request from client 802 originated by event 806 and looks up the requested document in the file system (not shown) with which server 712 (FIG. 7) is provided. The document corresponding to the request from client 802 is retrieved from server 812 and sent to client 802. Alternately, or in addition, the document corresponding to the request from client 802 can be generated by server 712 on a dynamic basis. For example, depending upon the content that is sought in conjunction with the request from client 802, a document can be configured to provide a specified structure, to include language independent elements that can be completed with language-related content by client 802. In accordance with an exemplary embodiment, server 812 provides a template document that includes language independent elements, which can be detected upon the template document being scanned, such as by a script operating at client 802. The template document generally has provisions for storing or presenting the desired features, information, or controls available for monitoring or configuring unit 714. The template document returned from server 812 does not necessarily include any language-related content that will be stored or presented to the user at client 802. The components in the template document that are to have language independent text are typically identified and provided by a developer who creates the template document.

In a sixth event 807, client 802 receives and renders the template document, in user interface 304 (FIG. 7), for example, which may be implemented by rendering the template document in a browser, such as browser 306 (FIG. 7). The template document may be rendered without language-related content that would be dependent upon a language selected by the user. In addition, the template document may be rendered in a background environment, so that it is not initially displayed in browser 306. Browser 306 renders the template document by interpreting the rendering instructions provided with the template document. The rendering instructions cause the browser to construct the components of the template document with appropriate attributes. Components may include such items as pictures, push buttons, radio buttons, labels, menus, drop down boxes, text boxes, audio segments, tactile actuator controls, and any other type of component or control that can be represented with the rendering instructions. The component attributes may be, for example, color, size or location on a display screen, component functional capability, and other attributes of the components to permit interaction with the user through the user interface, such as user interface 304 (FIG. 7). The rendering of the template document in event 807 provides for the rendering of each of the components in accordance with the rendering instructions, and without language-related content items that can be associated with the components. The language-related content items are provided to the components separately, to reflect the language selection.

In a seventh event 808, a script, such as may be provided with script code 720 (see FIG. 7), scans the constituent parts of the template document for language independent elements during or after the loading or rendering process. Such language independent elements, if present, indicate that language-related content should be inserted into corresponding components in the template document, for example into text or symbol variables or other types of media placeholders within the language independent elements provided within the template document. Each of the language independent elements identified in the scan of the template document may have an associated identifier that can be used to prompt a look-up of language-related content that also can have an associated identifier. The language-related content can be stored in a language file, a cache or a DOM, for example.

An eighth event 809 provides for the look-up of the language-related content items associated with the language independent elements identified during the scan of the template document. The script executing within browser 306 accesses the language-related content items downloaded in event 805, wherever they are stored. For example, the language-related content items may be parsed and stored in a cache or in a DOM associated with the user interface. The execution of the script continues until all language elements identified in the template document have been searched in the associated language file for language-related content items to be inserted into appropriate variables or placeholders in the template document.

After the language elements indicated in the template document have been identified and processed to obtain corresponding language-related content, the document can be stored or provided to a media output device implemented on client 802. According to an exemplary embodiment, the template document may be rendered and presented to the user without text, whereby the language-related content extracted from the identified text items may then be provided to the appropriate control or receptacle as determined by the language independent elements and component attributes or construction as the rendered template document is scanned by an executing script. Alternately, the entire document with outputs such as visual constructs and language-related content can be presented to the user after it is fully constructed, such as may be achieved in a background mode.

The language-related content items provided by language server 740 (see FIG. 7) from language files 742 (see FIG. 7) can be any type of representation of information that is meaningful to the user in the context of the user's language. For example, the language-related content may include text, alphanumeric characters, symbols, icons, indicators, indicia, audio, images, video, formatting instructions, such as left-to-right or right-to-left text orientation, formatting queues, tactile media representations, or any other type of media representation that may be provided in the document. In addition, the language-related content items can be any type of HTML code, for example, such as HTML code used to generate text or other language-related content as discussed above. The use of HTML code in a language-related content item enables the fully rendered document to support language representations that include, for example, symbols, right-to-left reading, or other conventions as may be used in the various languages encountered around the globe.

According to an exemplary embodiment, the language-related content can be provided in an XML file that is used to populate a template document for display to the user in relation to a desired language. With this configuration, the document template can be constructed as an HTML file, which can be implemented on a one-time basis, with variations in supported languages being provided through the appropriately selected language file. In this exemplary embodiment, the language independent element in the HTML file has an identifier that matches a corresponding identifier in the XML file. The script scanning the HTML file uses the identifier with the "Label:" notation to search for a match in the XML file. The matched identifier in the XML file references the desired language-related content items to be inserted into the HTML file in the placeholder location associated with the language independent element.

As illustrated in the above example, the language file can have tags, IDs or attributes that can be found with reference to language independent elements in the template document. The above discussed architecture permits language and component construction to be disassociated or decoupled. By separating language-related content from a document construct and components in the document, greater flexibility in reconfiguring the document is gained. If HTML file 718 is reconfigured, for example, to correspond with configuration changes in unit 714, such a reconfiguration can be done on a one-time basis. Reconfigured HTML file 718 continues to operate properly with the supported language files without necessarily requiring additional language-related maintenance efforts. Accordingly, further language translations to implement multi-language support for viewing a status or changing a configuration of unit 714 can be beneficially limited in scope.

FIGS. 7 and 8 describe exemplary systems and methods for implementing a variable language user interface based on retrieving language-related content from a central language server. The provision of a central language server obtains a number of benefits and advantages in implementing such systems and methods in accordance with the present disclosure. For example, the central language server can be used as a statistical gathering site for collecting information about the type and originating location of language requests. The collected statistics can be used to determine where updates or new language files may be most desirable or needed. The collected statistics may also be used for product tracking and deployment, as well as to determine how often products might be used. As another example, the system may be configured to provide a new language file to a user workstation whenever a user logs on, thereby providing events and indications that can be used to track product usage and deployment. In addition, particular web pages for a product that are used with the greatest frequency can be identified so that improvements to the user experience can be targeted, for example, by highlighting particular product features on high usage pages.

The arrangement of language files in a central language server also beneficially permits updates to be made in a centrally managed location or single access point so that all products receive the latest updates for languages regardless of the versions of software operating on a given product. The centrally located language files relieves administrators of the burden of ensuring a consistent deployment of upgrades across multiple products and locations with respect to language usage. Updates that are made centrally can also avoid the challenges of introducing new programming code at a product level. Moreover, requests received from various client workstations can include language related information that can be collected by the central language server to improve or update the language files and the language databases that are managed by the central language server. For example, some requests may include product comments or questions that provide feedback, reports of errors in language content or requests for expanded text descriptions. Because the language feature is abstracted from the web page document, for example, the language files on the language server can be maintained by a third party. The third party may have specialized customer or usage experience with maintaining or updating language content for various products, including technical products, without being required to be familiar with or manage the underlying products or technology. The central language server may also serve as a repository for language-related content so that the usage of multiple or variable languages permits expansion to products that may benefit from wider language acceptance in international markets.

Figure 9:
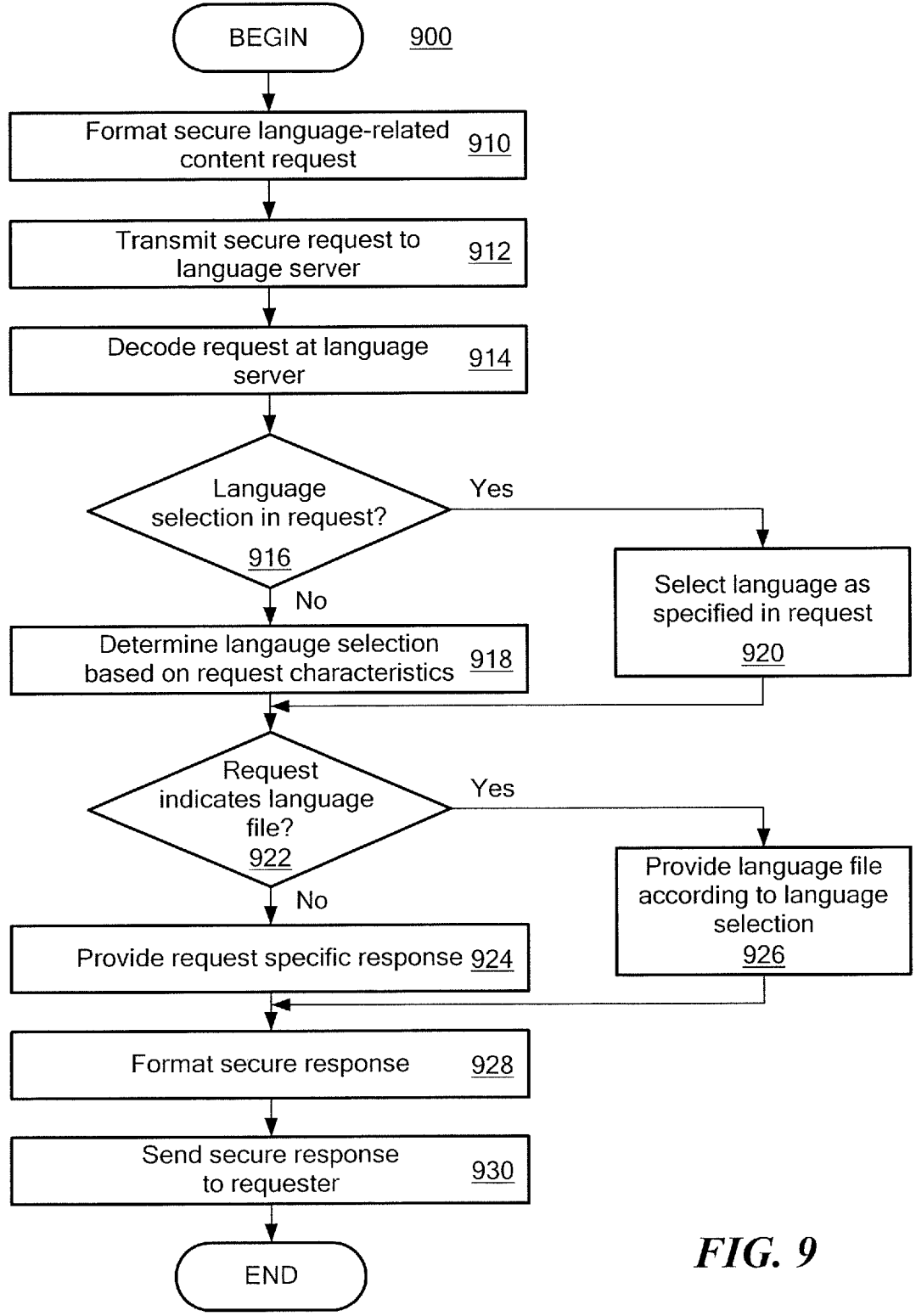
FIG. 9 is a flow chart illustrating a process for implementing a secure request/response exchange with a central language server in accordance with an exemplary embodiment of the disclosed systems and methods.

Referring now to FIG. 9, a flowchart 900 illustrates a process for providing secure language-related content to a requestor. The secure process may utilize well known security techniques, including asymmetric public/private key pair encryption schemes, hashing algorithms, authentication and digital signatures, which are well known and documented. The process illustrated in flowchart 900 begins with a language-related content request that can be formulated at a client workstation and secured using techniques such as encryption with a public key from a public/private key pair. Block 910 illustrates the formation and formatting of such a secure language-related content request. The secure request is transmitted to the language server, as illustrated in block 912, for processing to select a language and language-related content. The request is decoded at the language server, as illustrated in block 914, which decoding may be implemented by decrypting the secure request using a private key of the public/private key pair. This type of asymmetric encryption provides a relatively high level of security as long as the private key is maintained secretly at the language server site.

A decision block 916 illustrates a determination of whether the request contains an explicit selection for the desired language. If the request does explicitly specify a language, the selected language is chosen in accordance with such a specification, as illustrated in block 920 that is reached via the Yes branch of decision block 916. If the request does not include an explicit language selection, as illustrated with the No branch from decision block 916, the language server determines a language selection based on characteristics associated with the request, as illustrated in block 918. The determining characteristics associated with the request may include such items as an IP address or HTTP headers that can be used indicate an originating location for the request to help select a language.

Once the language is selected as described above, the language server can determine whether the request indicates that an entire language file should be returned in response, or whether the request is directed to a discrete language item, such as a single phrase or term. This determination is illustrated in decision block 922, where a request indicating a language file prompts a return of the language file according to the language selection, as illustrated in block 926, which is reached via the Yes branch of decision block 922. If there is no language file specified in the request, the language server can provide a response that may be specific to the request criteria, such as a single term, phrase or paragraph, for example.

This specific response is illustrated in block 924, which is reached via the No branch of decision block 922.

Once the response is determined based on the selected language and the type of response, the response can be secured in preparation for a transmission to the requestor, as illustrated in block 928. Securing the response may be implemented with a private key from a public/private key pair, to form a digital certificate that can be used to verify that the response originates from the language server. The digital certificate can be authenticated at the requestor location using the public key of the public/private key pair. The secure response is sent to the requestor as illustrated in block 930 to complete the independent language selection and content retrieval process.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A method of rendering a document on a computerized device with language-related content in accordance with a selected language, comprising:

identifying a first language content identifier in the document;

generating a secure request using one or more of a public encryption key of a public/private key pair and secure authorization credentials;

providing the secure request for language-related content to a language server, the language-related content being associated with a second language content identifier;

receiving, from the language server in a secure response that is responsive to the secure request, the language-related content for which the second language content identifier corresponds to the first language content identifier;

obtaining the language-related content from the secure response by one or more of decrypting the secure response and authenticating a digital signature associated with the secure response; and inserting at least a portion of the language-related content into the document at a location associated with the first language content identifier.

2. The method according to claim 1, further comprising:
providing the secure request to the language server; and
receiving the language-related content in response to an indication associated with the secure request.

3. The method according to claim 2, wherein the indication is the first language content identifier provided with the secure request.

4. The method according to claim 2, wherein the indication associated with the secure request is provided with the secure request, and is one or more of an explicit selection of a language, a network address, and a transport related parameter.

5. The method according to claim 1, further comprising:
providing the secure request to the language server from a client where the document is to be rendered.

6. The method according to claim 1, further comprising:
providing the secure request to the language server from a server where the at least a portion of the language-related content is to be inserted into the document.

7. The method according to claim 1, further comprising:
receiving the document prior to receiving the language-related content; and
scanning the document in accordance with a script to identify the first language content identifier.

8. The method according to claim 7, further comprising:
providing the secure request for the language-related content to the language server in response to identifying the first language content identifier.

9. The method according to claim 8, further comprising:
receiving a language file that includes the language-related content.

10. The method according to claim 1, further comprising:
including the first language content identifier in the secure request for the language-related content associated with the second language content identifier;
transmitting the secure request for the language-related content associated with the second language content identifier to the language server; and
using the first language content identifier to reference the language-related content.

11. The method according to claim 1, further comprising:
receiving a language file that includes the language-related content.

12. The method according to claim 11, further comprising:
receiving an XML file as the language file.

13. The method according to claim 12, further comprising:
using the second language content identifier to reference an XML tag associated with the language-related content in the received language file.

14. The method according to claim 1, further comprising:
storing the language-related content in one or more of a document object model (DOM) and a cache associated with the computerized device.

15. The method according to claim 1, further comprising:
associating an event handler with a user interface component associated with the first language content identifier.

16. The method according to claim 1, further comprising:
constructing at least a portion of the first language content identifier with HTML code.

17. A system for rendering a document on a computerized device with language-related content in accordance with a selected language, comprising:
a processing engine coupled to a memory storage being operable to store program instructions executable by the processing engine to:
identify a first language content identifier in the document;
generate a secure request using one or more of a public encryption key of a public/private key pair and secure authorization credentials;
provide the secure request for language-related content to a language server, the language-related content being associated with a second language content identifier;
receive, from the language server in a secure response that is responsive to the secure request, the language-related content for which the second language content identifier corresponds to the first language content identifier;
obtain the language-related content from the secure response by one or more of decrypting the secure response and authenticating a digital signature associated with the secure response; and
insert at least a portion of the language-related content into the document at a location associated with the first language content identifier.

18. The system according to claim 17, wherein the processing engine is further operable to:
provide the secure request to the language server; and
receive the language-related content in response to an indication associated with the secure request.

19. The system according to claim 18, wherein the indication is the first language content identifier provided with the secure request.

20. The system according to claim 17, wherein the indication is one or more of an explicit selection of a language, a network address, and a transport related parameter provided with the secure request.

21. The system according to claim 17, wherein the processing engine is further operable to:
provide the secure request to the language server from a client machine where the document is to be rendered.

22. The system according to claim 17, wherein the processing engine is further operable to:
provide the secure request to the language server from a server machine where the at least a portion of the language-related content is to be inserted into the document.

23. The system according to claim 17, wherein the processing engine is further operable to implement a script to search the document to identify the first language content identifier.

24. The system according to claim 17, wherein the processing engine is further operable to receive an XML file containing the language-related content.

25. The system according to claim 24, wherein the XML file further comprises at least one XML tag to reference the language-related content identified by the first language content identifier.

26. In a system including a computerized device and a language server, a method of rendering a document on the computerized device with language-related content, comprising:
receiving, at the language server, a request for language-related content from the computerized device, the language-related content having an associated identifier that specifies a location in the document;
matching, by the language server, the identifier associated with the requested language-related content with a corresponding identifier in a set of language-related content items;
extracting, by the language server, content associated with the corresponding identifier from the set of language-related content items;
sending the extracted content from the language server to the computerized device for insertion at the specified location in the document, the computerized device having a user interface, the identifier of the language-related content being associated with a component of the user interface, the component of the user interface being associated with a triggerable event handler;
triggering the event handler in response to a predetermined input associated with the component of the user interface; and
upon the triggering of the event handler, rendering at least a portion of the language-related content via the user interface at a location specified by the event handler, including loading the language-related content into a pop-up box.

27. The method according to claim 26 wherein the rendering of the at least a portion of the language-related content includes displaying the pop-up box loaded with the language-related content on the user interface.

\* \* \* \* \*